Oct. 28, 1958 G. H. ROYER ET AL 2,858,456
POWER CONTROL CIRCUITRY
Filed Sept. 20, 1954

WITNESSES:
E.A. McCloskey
John B. Davidson

INVENTORS
George H. Royer
and Richard L. Bright.
BY
Paul E. Friedemann
ATTORNEY

United States Patent Office 2,858,456
Patented Oct. 28, 1958

2,858,456

POWER CONTROL CIRCUITRY

George H. Royer, Pittsburgh, and Richard L. Bright, Hempfield Township, Westmoreland County, Pa., assignors to Westinghouse Electric Corporation, East Pittsburgh, Pa., a corporation of Pennsylvania Application September 20, 1954, Serial No. 457,232

5 Claims. (Cl. 307—88.5)

Our invention relates to power control circuits and, more particularly, to power control circuits making use of transistor switching devices.

In many applications of power control circuits, such as theater lighting control systems, there exists a requirement for direct-current control wherein a controlled direct current is a linear function of the amplitude of a direct-current control voltage. In prior art devices, it has been necessary to utilize systems making use of power supplies requiring expensive filter networks to convert the output of a rectified alternating-current source to relatively unvarying direct current. The cost of such filters makes it desirable to utilize the unfiltered output of an alternating-current rectifier in such systems and to control the average current or voltage in accordance with the amplitude of the direct-current control voltage.

One object of our invention is to provide a power control circuit wherein the average direct-current output voltage is proportional to the amplitude of a direct-current control signal.

Another object is to provide a power control circuit having an average direct-current output which is proportional to the amplitude of a direct control voltage wherein the controlled power source needs supply only unfiltered rectified alternating current.

Still another object is to provide a pulse-width modulator for a power control circuit wherein the time duration of the output voltage therefrom is functionally related to the amplitude of the direct control voltage.

Figure 1:
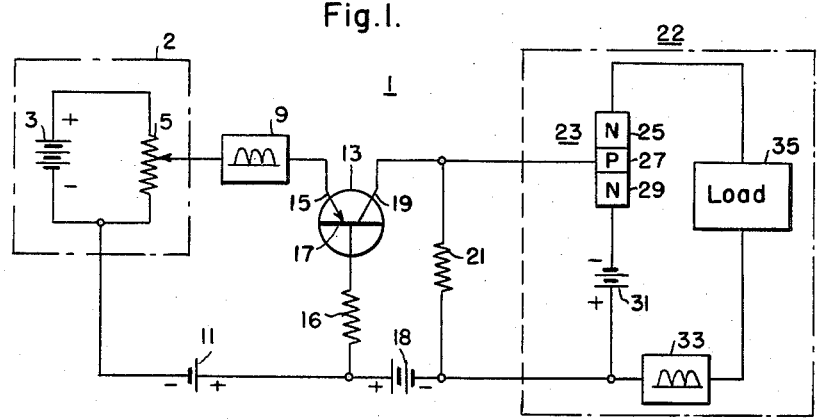
Figure 2:
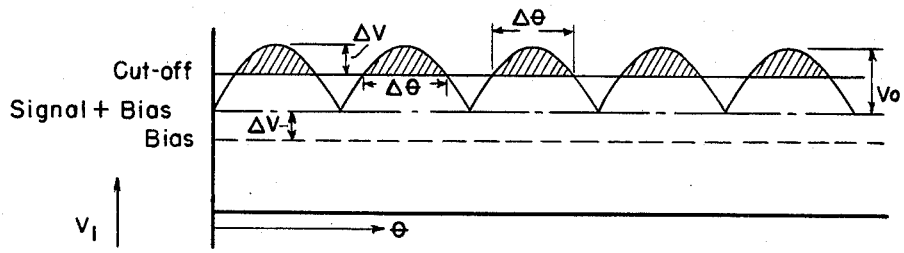
Figure 3:
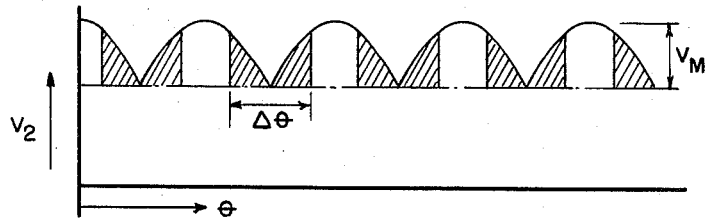

Other objects and features of our invention will become apparent from a consideration of the following detailed description thereof, when taken in connection with the accompanying drawing, wherein:

Figure 1 is a schematic diagram of a preferred embodiment of our invention;

Fig. 2 is a waveform representation of the instantaneous base to emitter voltage $V_1$ of transistor 13; and Fig. 3 is a waveform representation of the instantaneous emitter-to-collector voltage $V_2$ of transistor 23, which waveform representations are useful in understanding the operation of our invention. It is to be noted that the alternating voltages of Figs. 2 and 3 are shown with reference to a common time base.

The operation of our invention can best be understood by first considering the schematic diagram shown in Fig. 1. Reference numeral 22 refers generally to a type of transistor switch described in considerable detail in our copending application Serial No. 420,904 for "Transistor Power Control Circuits," filed April 5, 1954. This power switch comprises a junction type transistor between the base and one adjacent electrode of which is imposed a control voltage of reversible polarity having sufficient amplitude to drive the emitter-to-collector current alternately between cutoff and saturation. As described in the application, the emitter-to-collector current of an NPN junction type transistor will be cut off when the base electrode thereof is at a negative potential with respect to both adjoining electrodes and it is driven to saturation when the base is at a positive potential with respect to either adjoining electrodes. Similarly, the emitter-to-collector current of a PNP junction type transistor is at cutoff when the base voltage thereof is positive with respect to both adjoining electrodes and is at saturation when the base electrode is negative with respect to either adjoining electrode.

As shown, switching transistor 23 is depicted as being of the NPN junction type having an emitter electrode 29, a base electrode 27 and a collector electrode 25. It is to be understood that this transistor may be of the PNP junction type or other type of transistor capable of functioning as described in the aforementioned application. Serially connected between the emitter and collector electrodes is a bias source 31, a source of full-wave rectified alternating current 33, which may be a bridge rectifier, the input terminals of which are connected to any convenient source of alternating current such as an ordinary 60 cycle, 110 volt alternator, and a load 35 which conveniently may be a theater lighting installation. Bias source 31 is of a value that will bias transistor 23 to cutoff with no actuating signal applied to the base electrode thereof.

Switching transistor 23 is actuated by means of a switching circuit 1, the output impedance 21 of which is connected between base electrode 27 and the positive terminal of bias source 31. This switching circuit comprises a point-contact type transistor 13 between base electrode 17 and emitter electrode 15 of which is connected a high impedance resistor 16, biasing potential source 11, direct-current control voltage source 2, and full-wave rectified alternating-current source 9 in the order named. The aforementioned output impedance 21 is serially connected with potential source 18 between the junction of potential source 11 and resistance element 16 and the collector electrode 19 of transistor 13.

Bias source 11 may be an ordinary battery or other convenient source of relatively unvarying direct voltage, the positive terminal of which is connected to resistance element 16. Control voltage source 2 is depicted as a direct-current source 3 in parallel with a potentiometer, the tap of which is connected to emitter 15 through alternating-current source 9, the negative terminal direct-current source 3 being connected to the negative terminal of direct-current source 11. It is to be understood that this representation of control voltage source 2 is only exemplary and that any other suitable control potential source may be utilized.

The resistance value of resistor 16 is selected so that the transistor will operate in a negative resistance range as taught by A. E. Anderson in the article, "Transistors in Switching Circuits," Proc. IRE, volume 40, page 1541 to page 1546. When the base resistor is of sufficiently high resistance, there is a discontinuity in the collector current vs. emitter-to-base voltage characteristic of the transistor, such that the collector current proceeds to saturation almost instantly after collector current begins flowing. When the base current is reduced to a sufficiently low value, the collector current proceeds equally as rapidly to cutoff. This provides a suitable waveform for actuation of a transistor switch inasmuch as class A operation of the switch is avoided.

The output potential of bias source 11 is selected so that with either zero or a predetermined output voltage from control source 2, the emitter-to-base voltage imposed upon transistor 13 will be slightly below cutoff when alternating voltage source 9 reaches its maximum amplitude.

For reasons that will become apparent below, the voltage of source 9 is adjusted so as to be in phase quadrature with the voltage of source 33, source 9 reaching a maxima when the voltage of source 33 is at a null and vice versa.

Assuming that the voltage of control source 2 is initially zero, the voltage output of alternating-current source 9 will not be sufficient to overcome the bias source 11 so as to bring about even momentarily flow in the transistor. Therefore, the transistor will remain quiescent insofar as its output circuit is concerned.

When the voltage of control source 2 increases slightly to a given value ΔV as shown in Fig. 2, the transistor 13 will be triggered into operation by alternating-current source 9 as soon as bias source 11 is overcome, i. e., as soon as collector current flow begins. Likewise, when the base voltage subsequently falls below cutoff, the transistor will be triggered into its non-conducting state; transistor 13 will therefore conduct for a period $\Delta\theta$ that is related to the output of control voltage source 2 by the formula $$\Delta V = V_0\left(1 - \cos\frac{\Delta\theta}{2}\right) \quad (1)$$

where $V_0$ is the miximum amplitude of the output of alternating-current voltage source 9 and ΔV is the magnitude of the control voltage.

As mentioned above, the output voltage of source 33 is in phase quadrature with the voltage waveform of source 9; this relationship as shown by Figs. 2 and 3 taken together. The transistor switch 22 is thus triggered into conduction by the output voltage across resistor 21 for a period on either side of each null of the voltage waveform of source 33 represented by the shaded area of Fig. 3. The average value of the shaded area may be represented by the following formula:

$$V_{out} \text{ ave.} = V_m \frac{2}{\pi}\int_0^{\frac{\Delta\theta}{2}} \sin\theta d\theta \quad (2)$$

where $V_m$ is the maximum voltage from source 33. Integrating this expression, we obtain $$V_{out} \text{ ave.} = \frac{2V_m}{\pi}\left[1 - \cos\frac{\Delta\theta}{2}\right] \quad (3)$$

After substituting Equation 1, in Equation 3, the following expression is obtained:

$$V_{out} \text{ ave.} = \frac{2V_m}{\pi}\frac{\Delta V}{V_0} \quad (4)$$

Thus, it can be seen that the output voltage across load device 35 is a linear function of the output voltage of direct-current control device 2 inasmuch as both $V_m$ and $V_0$ are constants.

That the objects set forth above for our invention have been achieved is readily apparent. The power supply source controlled by our invention is a rectified alternating-current source, and the average value of the output voltage therefrom has been shown to be a linear function of the amplitude of a direct control voltage. The pulse-width modulator, which actuates the transistor switch that controls the rectified alternating-current source is likewise functionally related to the direct control voltage insofar as the time duration of the output pulses therefrom is concerned.

The invention is not to be restricted to the specific structural details, arrangement of parts or circuit connections herein set forth as various modifications thereof may be effected without departing from the spirit or scope of this invention.

We claim as our invention:

1. Power control apparatus comprising a transistor switch including transistor means having emitter, base and collector electrodes, a load and a first full-wave rectified sinusoidal voltage means serially connected between said emitter and collector electrodes, actuating means for said switch comprising point-contact transistor means including emitter, base and collector electrodes, the collector current of which is adapted to be triggered to a high value when the base-to-emitter voltage thereof reaches a given value; bias means, variable direct voltage signal means, and second full-wave rectified sinusoidal voltage signal means of constant maximum amplitude serially connected between said base and emitter electrodes of said point-contact transistor means, said first and second sinusoidal voltage signal means being in quadrature phase relationship, output impedance means in the collector circuit of said point-contact transistor means, the voltage across said output impedance means being coupled between base electrode and an adjacent electrode of said first-named transistor means to render said first-named transistor means conducting.

2. Power control apparatus comprising a transistor switch including transistor means having emitter, base and collector electrodes, first full-wave rectified sinusoidal voltage means connected to supply emitter-to-collector supply voltage to said transistor, actuating means for said switch comprising point-contact transistor means including emitter, base and collector electrodes the collector current of which is adapted to be triggered to a high value when the base-to-emitter voltage thereof reaches a given value; bias means, variable direct voltage signal means, and second full-wave rectified sinusoidal voltage signal means of constant maximum amplitude serially connected between said base and emitter electrodes of said point-contact transistor means, said first and second sinusoidal voltage signal means being in quadrature phase relationship, output impedance means in the collector circuit of said point-contact transistor means, the voltage across said output impedance means being coupled between base electrode and an adjacent electrode of said first-named transistor means.

3. Power control apparatus comprising a transistor switch including transistor means having emitter, base and collector electrodes, first full-wave rectified sinusoidal voltage means connected to supply emitter-to-collector supply voltage to said transistor, actuating means for said transistor including a second full-wave rectified sinusoidal voltage means in phase quadrature with said first means serially connected to a source of variable direct voltage, and means responsive to said second voltage means and said voltage source and coupled to said emitter and base electrodes adapted to apply a voltage pulse therebetween having a time duration equal to the time during which the sum of the voltages of said second voltage means and said voltage source on said second sinusoidal voltage means exceeds a given value.

4. Power control apparatus comprising point contact transistor means having emitter, base and collector electrodes, base resistance means connected to said base electrode and to a junction point, said base resistance means being of a value such as to insure operation in the negative resistance region of the collector current vs. emitter-to-ground voltage characteristic of said transistor; collector potential supply means and output impedance means serially connected between said junction point and said collector electrode; sinusoidal voltage means, control potential means and bias potential means serially connected between said junction point and said emitter electrode, said bias potential means biasing said transistor to cutoff at a predetermined output voltage from said control potential source, said control potential source being connected so as to oppose said bias potential means, junction transistor means having emitter, base and collector electrodes, said junction transistor being triggered into conduction over a portion of each cycle of said sinusoidal voltage means according to the formula $$V = V_0\left(1 - \cos\frac{\Delta\theta}{2}\right)$$

where V is the increment of the output voltage of said control voltage source over said bias potential means, $V_0$ is the maximum amplitude of said sinusoidal voltage source, and Δθ is the portion of a cycle of said sinusoidal voltage over which said transistor is conducting, said output impedance means being coupled to said base electrode and an adjoining electrode of said junction transistor so as to trigger said junction transistor into conduction upon the appearance of an output voltage thereacross; load means and a rectified full wave alternating voltage collector potential source serially connected between said emitter and collector electrodes of said junction transistor the rectified full-wave voltage of said collector potential source being in phase quadrature with the output of said sinusoidal voltage means such that the average voltage across said load means is given by the formula $$V_{ave} = \frac{2V_m}{\pi} \frac{\Delta V}{V_0}$$

where $V_m$ is the maximum amplitude of said full-wave rectified voltage and $\Delta V$ is the magnitude of the control potential.

5. Power control apparatus comprising point-contact transistor means having emitter, base and collector electrodes, base resistance means connected between said base electrode and a junction point of a value such as to insure operation in the negative resistance region of the collector current vs. emitter-to-ground voltage characteristic of said transistor; collector potential supply means and output impedance means serially connected between said junction point and said collector electrode; full wave rectified alternating voltage control source, control potential means and bias potential means connected between said base resistance means and said emitter electrode, said bias potential means biasing said transistor to cutoff at a predetermined output voltage from said control potential source, said control potential source being connected so as to oppose said bias voltage, junction transistor means having emitter, base and collector electrodes said junction transistor being triggered into conduction over a portion of each cycle of said sinusoidal voltage means according to the formula $$V = V_0 \left(1 - \cos\frac{\Delta\theta}{2}\right)$$

where V is the increment of the output voltage of said control voltage source over said bias potential means, $V_0$ is the maximum amplitude of said sinusoidal voltage source, and Δθ is the portion of a cycle of said sinusoidal voltage over which said transistor is conducting, said output impedance means being coupled to said base electrode of said junction transistor and an adjoining electrode so as to trigger said junction transistor into conduction upon the appearance of an output voltage thereacross; load means and a rectified full wave alternating voltage collector potential source serially connected between said emitter and collector electrodes of said junction transistor the rectified full-wave voltage of said collector potential source being in phase quadrature with the output of said full wave rectified alternating voltage control source, such that the average voltage across said load means is given by the formula $$V_{ave} = \frac{2V_m}{\pi} \frac{\Delta V}{V_0}$$

where $V_m$ is the maximum amplitude of said full-wave rectified voltage and $\Delta V$ is the magnitude of the control potential.

References Cited in the file of this patent
UNITED STATES PATENTS

| | | |
|---|---|---|
| 2,223,430 | Smith | Dec. 3, 1940 |
| 2,490,026 | Buckbee | Dec. 6, 1949 |
| 2,627,039 | MacWilliams, Jr. | Jan. 27, 1953 |
| 2,698,392 | Herman | Dec. 28, 1954 |
| 2,728,857 | Sziklai | Dec. 27, 1955 |

FOREIGN PATENTS

| | | |
|---|---|---|
| 165,378 | Australia | Jan. 14, 1954 |
| 701,634 | Great Britain | Dec. 30, 1953 |